Aug. 15, 1961 R. WELLS 2,995,824
TANK GAUGE
Filed Sept. 2, 1958
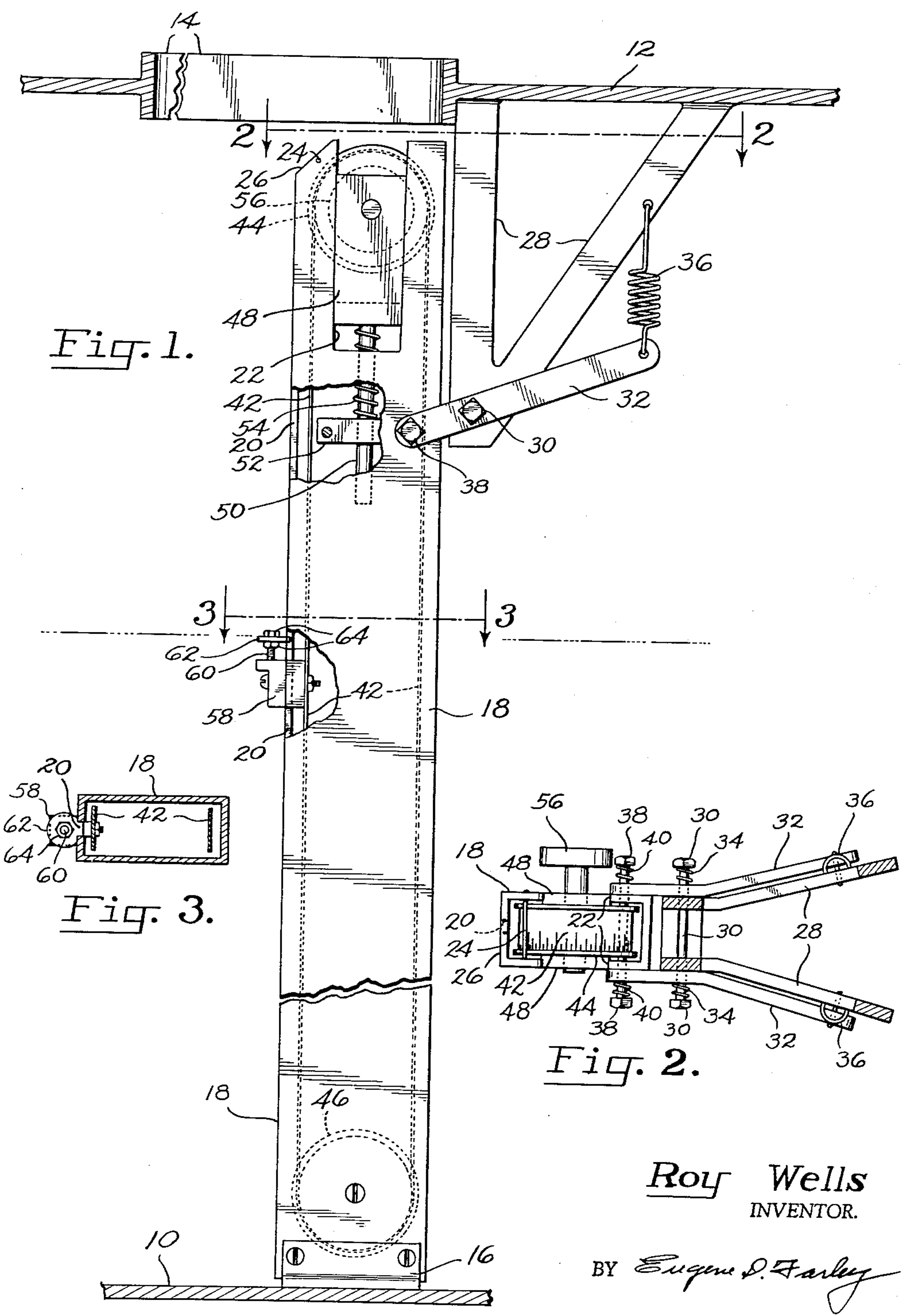
Roy Wells
INVENTOR.
BY Eugene D. Farley
Atty.

United States Patent Office 2,995,824
Patented Aug. 15, 1961

2,995,824

TANK GAUGE

Roy Wells, 6717 SE. 50th Ave., Portland, Oreg.

Filed Sept. 2, 1958, Ser. No. 758,199
2 Claims. (Cl. 33—126)

This invention relates to gauges for determining the liquid contents of tanks, particularly of tanks such as those present on tank trucks which are subject to working and deformation with use.

Several devices have been employed heretofore for measuring the liquid contents of tank trucks. One of these, the simple dip stick inserted through the manhole of the truck, is obviously inconvenient and inaccurate, particularly since in time it wears off at the bottom.

In a second system a calibrated stick is suspended from the top of the tank adjacent the manhole. This device is also unsatisfactory since the distance between the top and the bottom of the tank is variable depending upon such factors as deformation of the tank, the presence of an operator standing upon it, and the like. Also, the sticks tend to break loose from their fasteners and become lost in the tank.

Accordingly it is the general object of the present invention to provide a tank gauge which overcomes the foregoing deficiencies of the prior art gauges and which is accurate under all conditions of service, easily read, and readily accessible for servicing.

The manner in which the foregoing and other objects of this invention are accomplished will be apparent from the accompanying specification and claims considered together with the drawings wherein:

FIG. 1 is a view in side elevation of the herein described tank gauge partly broken away to illustrate better its internal construction;

FIG. 2 is a transverse sectional view taken along line 2—2 of FIG. 1 and illustrating particularly the mounting means for the herein described tank gauge; and FIG. 3 is a transverse sectional view taken along line 3—3 of FIG. 1 and illustrating particularly the liquid level indicating device of the herein described tank gauge.

In general, the tank gauge of my invention comprises scale means mounted vertically on a suitable supporting structure. A suitable drive is connected to the scale means for reciprocating it in a substantially vertical plane. Liquid level indicating means are mounted on the scale means in a location predetermined to set the scale means on a reading of tank liquid content when the indicating means is set substantially at the tank liquid level. Thus the tank content may be gauged merely by setting the indicating means at the level of the liquid and reading off the corresponding value on the calibrated scale.

Considering the foregoing in greater detail and with particular reference to the drawings:

In the illustrated form of the invention, the gauge is mounted in a tank truck having a bottom wall 10 and a top wall 12. The latter is provided with a manhole 14 used as usual for filling and servicing the tank and through which the presently described gauge may be read.

A pair of spaced angle irons or brackets 16 are fixed to the bottom of the tank below manhole 14. The bottom of an elongated vertical housing 18 is bolted to the angle irons. Housing 18 preferably is rectangular in cross section. One of its edges is formed with a longitudinal slot 20. The upper portions of each of its opposite sides are formed with rectangular recesses 22. A reference pin 24 is mounted at the top of the housing the upper edges of which are cut away immediately above the pin to form angled surfaces 26, thereby rendering the pin more easily visible.

Although the lower end of housing 18 is rigid to the bottom of the tank, the upper end thereof is mounted in such a manner that it can move as required by working or deformation of the tank. The mounting accomplishing this purpose is illustrated in FIGS. 1 and 2.

A pair of V-shaped brackets 28 are welded to the top of the tank adjacent opening 14. A bolt 30 pivotally supports a pair of lever arms 32 at the lower end of the brackets. Springs 34 mounted on the extremities of the bolt and maintained under compression by the setting of the nut thereon keep the levers pressing tightly against the brackets.

Coil springs 36 interconnect the rearward end of levers 32 and the portions of brackets 28 immediately above. The forward ends of the levers are pivotally connected by means of bolts 38 to housing 18, springs 40 analogous to springs 34 being provided to maintain the lever arms pressed tightly against the housing. This assembly maintains the housing erect and in position at all times, irrespective of any movement which may alter the dimensions or shape of the tank.

A scale 42 used for measuring the amount of liquid contained in the tank is rotatably mounted in housing 18. In the illustrated form of the invention, the scale comprises an endless tape which may read directly in gallons or in units of lineal measurement convertible to gallons by reference to the tank calibration chart.

Scale 42 is mounted on an upper pulley 44 and a lower pulley 46. The latter is journaled between the side walls of housing 18. The former preferably is mounted on a spring pressed tensioning member including a U-shaped cross head 48 which moves in rectangular recesses 22, and shaft 50 which is slidably mounted in bracket 52. Springs 54 are interposed between bracket 52 and cross head 48, thereby tensioning the pulley and maintaining the scale taut. A wheel 56 is keyed to the shaft of pulley 44 for rotating the same and hence for rotating the scale.

Liquid level indicating means are mounted on the scale at a location predetermined to set it on a reading of tank liquid content. To this end there is provided a support 58 bolted to the scale and supporting a vertically extending bolt 60.

An indicating plate 62 is adjustably supported on this bolt by means of adjustment nuts 64. Both support member 58 and plate 62 slide in vertical slot 20 in the housing, referred to above.

Scale 42 is calibrated in units such that when plate 62 is stationed at the level of the liquid in the tank, the volume of the tank contents may be read directly off the scale, using pin 24 as a reference point. Hence when using the gauge as an innage gauge, for which use it is particularly well suited, hand wheel 56 is turned until the selected volume, say 3000 gallons as determined either by direct reading or by reference to the tank calibrating chart appears as a scale reading directly behind pin 24. The tank then is filled in the usual manner until the level of the liquid just covers indicating plate 62. Thereupon the tank will contain the stipulated amount of liquid. However, the amount of liquid in the tank can be ascertained at any time by adjusting plate 62 until it is at the liquid level and then noting the reading on the scale opposite pin 24.

Thus it is apparent that by the present invention, I have provided a tank gauge which is easily read and adaptable for installation in a wide variety of tanks. Furthermore, it is accurate and maintains its accuracy despite working of the tank and changes in its dimensions induced by thermal and mechanical factors.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In combination, a liquid receptacle having a bottom wall, a top wall having a filler opening, an elongated vertical housing secured to the bottom wall in vertical alignment with the filler opening and terminating at its upper end adjacent the opening interiorly of the receptacle, a first pulley rotatably mounted interiorly of the housing at one end thereof, the housing having vertical guide slots adjacent its end opposite from the first pulley, pulley support means slidably mounted in the guide slots, a second pulley rotatably supported on the pulley support means interiorly of the housing, spring means engageable between the housing and the pulley support means for urging the latter away from the first pulley, an endless scale carried on the pulleys for rotatable adjustment and tensioned on the pulleys by the spring means, and indicating means mounted on the scale for adjustment relative to the scale to set the scale on a reading of tank liquid content when the indicating means is set substantially at the tank liquid level, the indicating means projecting laterally from the housing and having an upper indicating surface visible through the filler opening to accomplish said liquid level setting of the indicating means.

2. The apparatus of claim 1 including interiorly depending bracket means secured to the top wall of the receptacle, and spring operated link means pivotally interconnecting the bracket means and the upper end of the housing for holding the housing in upright position while permitting relative movement between the latter and the receptacle to compensate for distortion of the receptacle.

References Cited in the file of this patent

UNITED STATES PATENTS

| | | |
|---|---|---|
| 763,716 | Bray | June 28, 1904 |
| 1,375,132 | Cox | Apr. 19, 1921 |
| 1,379,271 | Malinowsky | May 24, 1921 |

FOREIGN PATENTS

| | | |
|---|---|---|
| 357,799 | Italy | Mar. 28, 1938 |
| 1,023,306 | France | Dec. 30, 1952 |